United States Patent
Yan et al.

(10) Patent No.: US 8,818,368 B2
(45) Date of Patent: Aug. 26, 2014

(54) METHOD, SYSTEM AND DEVICE FOR TRIGGERING SCHEDULING INFORMATION REPORTING

(75) Inventors: Gao Yan, Beijing (CN); Xiaoka Li, Beijing (CN); Ying Zhang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 225 days.

(21) Appl. No.: 13/502,998

(22) PCT Filed: Dec. 21, 2010

(86) PCT No.: PCT/CN2010/080060
§ 371 (c)(1),
(2), (4) Date: Apr. 19, 2012

(87) PCT Pub. No.: WO2011/076106
PCT Pub. Date: Jun. 30, 2011

(65) Prior Publication Data
US 2012/0202497 A1  Aug. 9, 2012

(30) Foreign Application Priority Data
Dec. 25, 2009  (CN) .......................... 2009 1 0243113

(51) Int. Cl.
*H04W 4/00* (2009.01)
(52) U.S. Cl.
USPC .................. 455/435.1; 455/450; 455/455
(58) Field of Classification Search
CPC ............................. H04W 76/06; H04W 68/00
USPC ...................... 455/435.1, 450, 455
See application file for complete search history.

(56) References Cited

U.S. PATENT DOCUMENTS

| | | | | |
|---|---|---|---|---|
| 2006/0268717 A1* | 11/2006 | Kanterakis | .................... | 370/235 |
| 2010/0220672 A1* | 9/2010 | Zhang et al. | ................... | 370/329 |
| 2010/0271939 A1* | 10/2010 | Gholmieh et al. | ............ | 370/228 |
| 2011/0122783 A1* | 5/2011 | Lin et al. | ....................... | 370/252 |
| 2011/0122818 A1* | 5/2011 | Dwyer et al. | ................. | 370/328 |
| 2012/0113960 A1* | 5/2012 | Chin et al. | ..................... | 370/331 |

FOREIGN PATENT DOCUMENTS

| | | |
|---|---|---|
| CN | 101039453 | 9/2007 |
| CN | 101163317 | 4/2008 |
| CN | 101860905 | 10/2010 |

OTHER PUBLICATIONS

Office Action and translation from Chinese Application No. 200910243113.3 dated Jan. 29, 2013.

* cited by examiner

*Primary Examiner* — Qun Shen
(74) *Attorney, Agent, or Firm* — Marshall, Gerstein & Borun LLP

(57) ABSTRACT

Embodiments of the application provide a method, system and device for triggering scheduling information reporting. The method including: determining, by a terminal, whether state transition occurs or an Enhanced Dedicated Channel (E-DCH) Radio Network Temporary Identifier (E-RNTI) changes; when determining the state transition occurs or the E-RNTI changes, adopting, by the terminal, reconfigured resources or a new E-RNTI to trigger the scheduling information reporting. By adopting the method for triggering the scheduling information reporting put forward by embodiments of the application, information about state transition at a terminal or changed E-RNTI may be reported to a Base Station (BS) timely, so as to guarantee normal communications between BS and terminal.

10 Claims, 3 Drawing Sheets

METHOD, SYSTEM AND DEVICE FOR TRIGGERING SCHEDULING INFORMATION REPORTING

TECHNOLOGY FIELD

The invention relates to mobile communications technologies, and more particularly, to a method, system and device for triggering scheduling information reporting.

BACKGROUND OF THE INVENTION

In current mobile communication system, connection state of Radio Resource Control (RRC) layer of a terminal mainly includes idle state, cell forward access channel (CELL-FACH) state, cell paging channel (CELL-PCH) state, Universal Terrestrial Radio Access Network (UTRAN) Registration Area paging channel (URA-PCH) state, and cell dedicated channel (CELL-DCH) state. The CELL-DCH state, CELL-FACH state, CELL-PCH state and URA-PCH state are referred to as RRC connection state.

In an enhanced High Speed Packet Access (HSPA) system, HSPA technologies have been introduced to CELL-FACH state, CELL-PCH state and URA-PCH state. Different RRC connection states possess different data transmission formats. At present, it is stipulated that a terminal adopts a transmission block table corresponding to stipulated capability grade to transmit data with a Base Station (BS), when the terminal is in one of the enhanced CELL-FACH state, enhanced CELL-PCH state, or enhanced URA-PCH state. In the CELL-DCH state, a terminal may adopt a transmission block table corresponding to actual capability grade to transmit data with the BS. Above stipulated capability grade may be different from actual capability grade of the terminal.

A Radio Network Controller (RNC) sends a dedicated signaling to notify the terminal to execute state transition. The dedicated signaling may include destination state of a terminal and corresponding terminal identifier, terminal wireless bearer, transmission channel, physical channel resources, and so on. In an enhanced HSPA system, the dedicated signaling sent out is an RRC signaling. The terminal identifier mainly includes a High-Speed Downlink Shared Channel (HS-DSCH) Radio Network Temporary Identifier (H-RNTI) and an Enhanced Dedicated Channel (E-DCH) Radio Network Temporary Identifier (E-RNTI), which are used for differentiating terminals, during process of data transmission in the HS-DSCH and E-DCH.

Deficiencies of data transmission in existed enhanced HSPA system are as follows. When a terminal executes state transition between the CELL-DCH state and one of the enhanced CELL-FACH state, the enhanced CELL-PCH state and the enhanced URA-PCH state, according to an instruction from the RNC, the BS may not immediately learn information about state transition of the terminal. Alternatively, when the terminal enters a new state, corresponding identifier which is used for distinguishing new state doesn't change. Thus, after state transition, the terminal may adopt data transmission format corresponding to new state, to send uplink data. However, the BS may still adopt data transmission format corresponding to the state before state transition to decode. Thus, unsuccessful decoding occurs. That is, in existed enhanced HSPA system, inconsistence for learning state transition at the terminal between the BS and terminal may result in that, normal communications between the BS and terminal cannot be executed. In addition, when a terminal cannot execute state transition successfully, the terminal in an original state may send a corresponding failure message with original configuration.

SUMMARY OF THE INVENTION

An objective of the application is aimed to solve one of technical problems mentioned above, particularly to solve the problem of reporting information about state transition at a terminal to a BS.

To achieve above objectives, the application from one aspect provides a method for triggering scheduling information reporting, which includes the following steps, determining, by a terminal, whether state transition occurs or an Enhanced Dedicated Channel (E-DCH) Radio Network Temporary Identifier (E-RNTI) changes; when determining the state transition occurs or the E-RNTI changes, adopting, by the terminal, reconfigured resources or a new E-RNTI to trigger the scheduling information reporting.

As an embodiment of the application, determining by the terminal whether the state transition occurs or the E-RNTI changes includes: determining, by the terminal, whether the state transition occurs, according to a state indication carried in a dedicated signaling sent by a Radio Network Controller (RNC); or, determining, by the terminal, whether the E-RNTI changes, according to information stored in the terminal.

As an embodiment of the application, the state transition refers to that the terminal transits from cell dedicated channel (CELL-DCH) state to one of: cell forward access channel (CELL-FACH) state, cell paging channel (CELL-PCH) state, Universal Terrestrial Radio Access Network (UTRAN) Registration Area paging channel (URA-PCH) state.

As an embodiment of the application, adopting by the terminal the reconfigured resources or the new E-RNTI to trigger the scheduling information reporting includes: selecting, by the terminal, different carrying modes of the scheduling information to report the scheduling information, based on whether there is a grant for sending new data within current sub-frame or extended window. When there is no available grant for sending the new data within current sub-frame or extended window, sending the scheduling information about grant request type via an Enhanced Random Uplink Control Channel (E-RUCCH); when there is an available grant for sending the new data within current sub-frame or extended window, sending the scheduling information about scheduling request type with the grant, wherein the grant doesn't include grant allocated for an original E-RNTI by a Base Station (BS).

As an embodiment of the application, after determining the state transition occurs or the E-RNTI changes, and sending the scheduling information about the grant request type via the E-RUCCH, the method further includes: stopping an ongoing E-RUCCH process, that is, setting a sending counter and a timer of the E-RUCCH respectively as an original value.

The application also provides a method for triggering scheduling information reporting, including: receiving, by a BS, scheduling information reporting triggered by a terminal, determining whether state transition occurs at the terminal or an E-RNTI changes, according to the scheduling information reported; when determining the state transition occurs at the terminal or the E-RNTI changes, determining, by the BS, a new data transmission format or a new E-RNTI for the terminal.

As an embodiment of the application, determining by the BS the state transition occurs at the terminal or the E-RNTI changes, according to the scheduling information reported, includes: when the terminal reports the scheduling information via an E-RUCCH, detecting, by the BS, the E-RNTI carried in the E-RUCCH; when detecting the E-RNTI is a new E-RNTI, determining the E-RNTI of the terminal changes; when the terminal reports the scheduling information with a new grant, determining, by the BS, whether there is an ongoing uplink data transmission of the terminal, by detecting new resources; when determining there is an ongoing uplink data transmission of the terminal by detecting the new resources, determining the state transition occurs at the terminal, and determining the new data transmission format for the terminal.

As an embodiment of the application, the state transition refers to that the terminal transits from CELL-DCH state to one of: CELL-FACH state, CELL-PCH state, URA-PCH state.

The application also provides a terminal, including a determining module and a triggering module; wherein the determining module is to determine whether state transition occurs at the terminal or an E-RNTI changes; and the triggering module is to adopt reconfigured resources or a new E-RNTI to trigger scheduling information reporting, when the state transition occurs at the terminal or the E-RNTI changes.

As an embodiment of the application, the terminal further includes a counter and timer controlling module, which is to set a sending counter and timer of the E-RUCCH respectively as an original value, after sending the scheduling information about the grant request type via the E-RUCCH.

The application also provides a BS, including a receiving module and a state determining module, wherein the receiving module is to receive scheduling information reported by a terminal; and the state determining module is to determine whether state transition occurs at the terminal or E-RNTI changes, according to the scheduling information reported.

By adopting the method for triggering scheduling information reporting provided by embodiments of the application, information about state transition at the terminal or changed E-RNTI may be reported to the BS timely, so as to ensure normal communications between a BS and a terminal.

BRIEF DESCRIPTION OF THE DRAWINGS

Above mentioned and/or additional aspects and advantages of the application may become apparent and easy to understand, from the following descriptions about embodiments accompanying with attached figures.

EMBODIMENTS OF THE INVENTION

Embodiments of the application are described in the following in detail. Examples in the embodiments are shown in attached figures. Same or similar labels in all the figures denote same or similar component, or component with same or similar functions. The embodiments described in the following accompanying with attached figures are exemplary, which are only used for describing the principles included therein, instead of being interpreted as limitation to the principles of the application.

Figure 1:
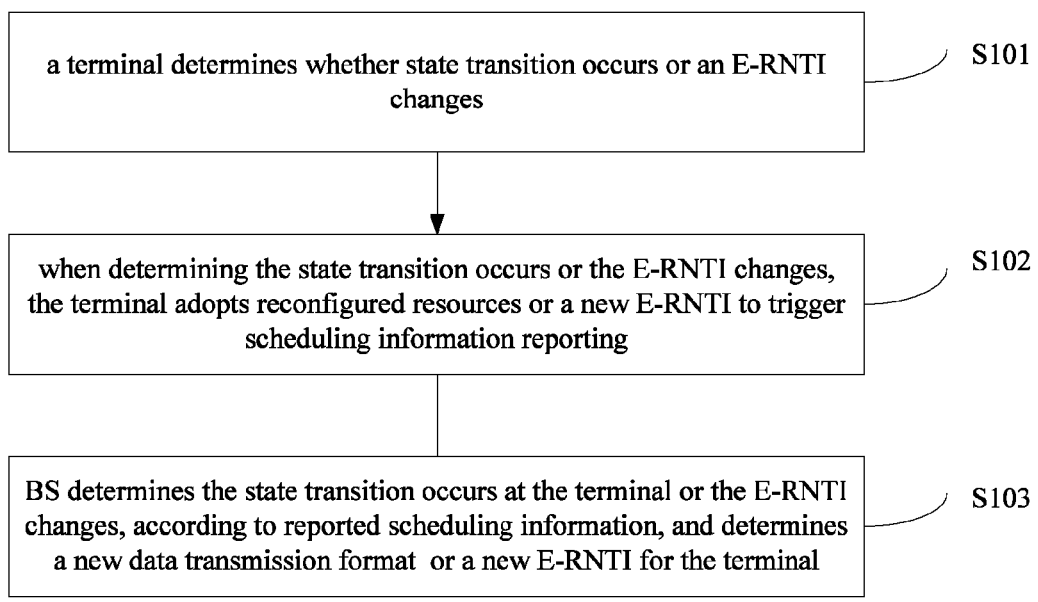
FIG. 1 is a flowchart illustrating a method for triggering scheduling information reporting, in accordance with a first embodiment of the application.

As shown in FIG. 1, FIG. 1 is a flowchart illustrating a method for triggering scheduling information reporting, in accordance with a first embodiment of the application. The method includes the following blocks.

Block S101, a terminal determines whether state transition occurs or the E-RNTI changes.

Regarding how a terminal to determine whether state transition occurs or the E-RNTI changes, the application provides the following determining scheme. Definitely, a person having ordinary skill in the art may put forward other modifications or changes, according to the following scheme. These modifications or changes should be covered by the protection scope of the application.

The terminal may determine whether the state transition occurs, according to a state indication carried in a dedicated signaling sent by an RNC. When the state indication is different, the state transition occurs. Alternatively, the terminal may determine whether the E-RNTI changes, according to information stored in the terminal. If the information stored is different, the E-RNTI changes.

Block S102, when determining the state transition occurs or the E-RNTI changes, the terminal may adopt reconfigured resources or new E-RNTI to trigger scheduling information reporting.

Regarding how the terminal to trigger scheduling information reporting with reconfigured resources or new E-RNTI, the application puts forward the following scheme. Definitely, a person having ordinary skill in the art may put forward other modifications or changes, according to the following scheme. These modifications or changes should be covered by scope of the application.

The terminal may select different carrying modes of scheduling information to report the scheduling information, based on whether there is a grant for sending new data within current sub-frame or extended window. When there is no available grant for sending new data within current sub-frame or extended window, the terminal may send the scheduling information about grant request type via an Enhanced Random Uplink Control Channel (E-RUCCH). When there is an available grant for sending new data within current sub-frame or extended window, the terminal may send scheduling information about scheduling request type with above grant for sending new data. The grant for sending new data doesn't include grant allocated by the BS for original E-RNTI.

It should be noted that, after determining the state transition occurs or the E-RNTI changes, and sending the scheduling information about grant request type via the E-RUCCH, stop the ongoing E-RUCCH process. That is, set sending counter and timer of the E-RUCCH as respective original value, so as to avoid stopping the E-RUCCH sending process of the terminal, resulted from continuous accumulation of the sending counter.

Block S103, the BS determines the state transition occurs at the terminal or the E-RNTI changes, according to the reported scheduling information, and determines new data transmission format or new E-RNTI for the terminal.

Regarding how the BS to determine the state transition occurs at the terminal or the E-RNTI changes, according to reported scheduling information, the application provides the following determining scheme. Definitely, a person having ordinary skill in the art may put forward other modifications or changes, based on the following scheme. These modifications or changes should be covered by the scope of the application.

When the terminal reports the scheduling information via the E-RUCCH, the BS may detect the E-RNTI carried by the E-RUCCH. When detecting the E-RNTI is a new E-RNTI, the BS may determine the E-RNTI changes. When the terminal reports the scheduling information with new grant, the BS may determine whether an ongoing uplink data transmission of the terminal has been detected from the new resources. When detecting the ongoing uplink data transmission of the terminal from the new resources, the BS may determine the state transition occurs at the terminal, and determine new data transmission format for the terminal.

Figure 2:
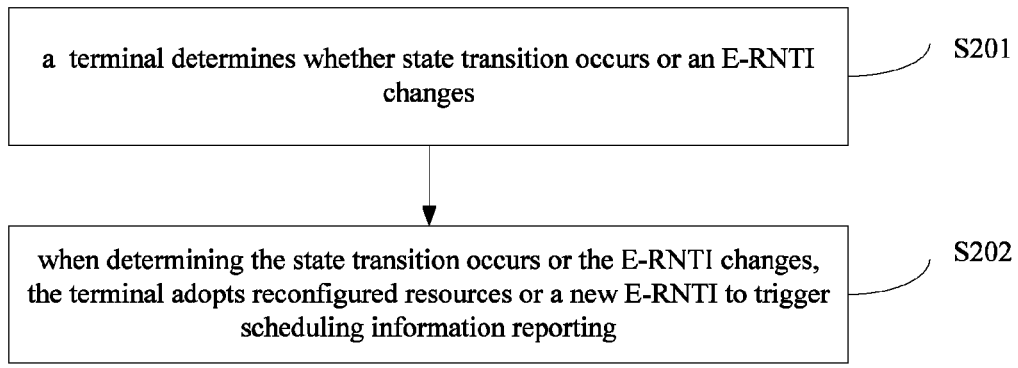
FIG. 2 is a flowchart illustrating a method for triggering scheduling information reporting, in accordance with a second embodiment of the application.

As shown in FIG. 2, FIG. 2 is a flowchart illustrating a method for triggering scheduling information reporting, in accordance with a second embodiment of the application. The method includes the following blocks.

Block S201, a terminal determines whether state transition occurs or E-RNTI changes.

Block S202, when determining the state transition occurs or the E-RNTI changes, the terminal may adopt reconfigured resources or new E-RNTI to trigger scheduling information reporting.

Specific implementation modes of blocks S201 and S202 are similar to blocks S101 and S102, which are not repeated here.

Figure 3:
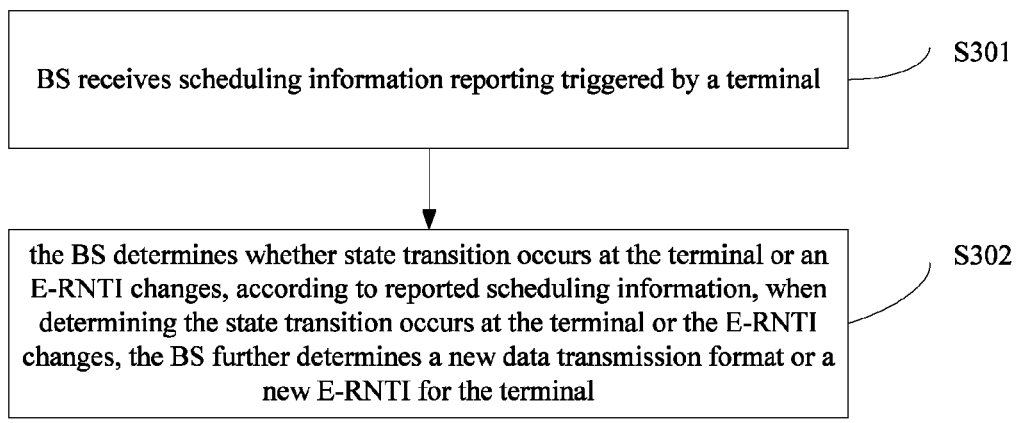
FIG. 3 is a flowchart illustrating a method for triggering scheduling information reporting, in accordance with a third embodiment of the application.

As shown in FIG. 3, FIG. 3 is a flowchart illustrating a method for triggering scheduling information reporting, in accordance with a third embodiment of the application. The method includes the following blocks.

Block S301, a BS receives reported scheduling information triggered by a terminal.

Block S302, the BS determines whether state transition occurs at the terminal or E-RNTI changes, according to the reported scheduling information. When determining the state transition occurs at the terminal or the E-RNTI changes, the BS may further determine new data transmission format for the terminal or new E-RNTI.

Specific implementation mode of block S302 is similar to block S103, which are not repeated here.

Figure 4:
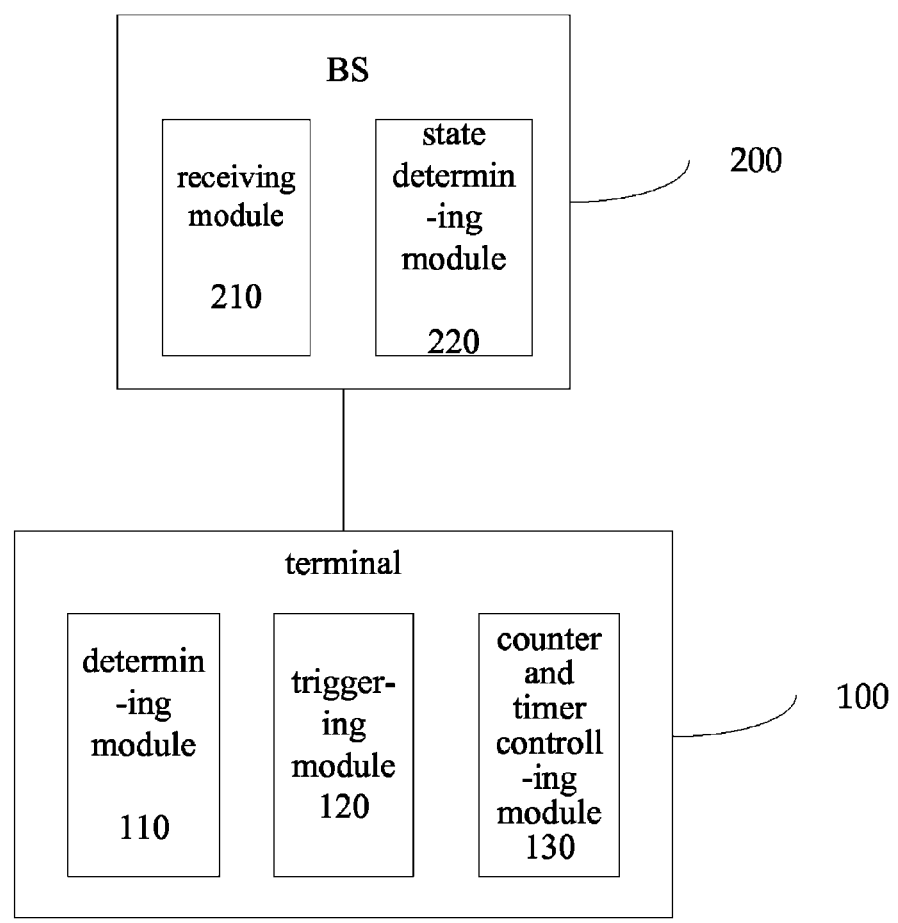
FIG. 4 is a schematic diagram illustrating structure of a system for triggering scheduling information reporting, in accordance with a fourth embodiment of the application.

FIG. 4 is a schematic diagram illustrating structure of a system for triggering scheduling information reporting, in accordance with a fourth embodiment of the application. The system includes a terminal 100 and a BS 200. The terminal 100 is used for determining whether state transition occurs or whether E-RNTI changes. When determining the state transition occurs or the E-RNTI changes, the terminal may adopt reconfigured resources or new E-RNTI to trigger scheduling information reporting. The BS 200 is used for receiving the scheduling information reported by terminal 100, and determining whether state transition occurs at the terminal or the E-RNTI changes, according to the reported scheduling information.

The terminal 100 includes a determining module 110 and a triggering module 120. The determining module 110 is used for determining whether state transition occurs at the terminal 100 or whether the E-RNTI changes. The triggering module 120 is used for adopting reconfigured resources or new E-RNTI to trigger scheduling information reporting, when the state transition occurs at the terminal 100 or the E-RNTI changes. The terminal 100 may also include a counter and timer controlling module 130, which is used for setting a sending counter and a timer of the E-RUCCH as respective original value, after sending the scheduling information about grant request type via the E-RUCCH.

The BS 200 includes a receiving module 210 and a state determining module 220. The receiving module 210 is used for receiving the scheduling information reported by terminal 100. The state determining module 220 is used for determining the state transition occurs at the terminal 100 or the E-RNTI changes, according to the reported scheduling information.

Working principles of determining module 110 and triggering module 120, both of which are included in the terminal 100, may respectively refer to blocks S101 and S102. Working principles of receiving module 210 and state determining module 220, both of which are included in the BS 200, may refer to above block S103. Repeated descriptions are not listed here.

By adopting the method for triggering scheduling information reporting put forward by embodiments of the application, information about state transition at the terminal or changed E-RNTI may be reported to BS timely, so as to guarantee normal communications between BS and terminal.

The foregoing is only preferred embodiments of the application. It should be pointed out that, regarding a person having ordinary skill in the art, improvements and retouches may be made, without departing from principles of the application. These improvements and retouches should be covered by protection scope of the application.

The invention claimed is:

1. A method for triggering scheduling information reporting, the method comprising:
   determining, by a terminal, whether state transition occurs or an Enhanced Dedicated Channel (E-DCH) Radio Network Temporary Identifier (E-RNTI) changes;
   when determining the state transition occurs or the E-RNTI changes, adopting, by the terminal, reconfigured resources or a new E-RNTI to trigger the scheduling information reporting;
   wherein adopting by the terminal the reconfigured resources or the new E-RNTI to timer the scheduling information reporting comprises,
   selecting, by the terminal, different carrying modes of the scheduling information to report the scheduling information, based on whether there is a grant for sending new data within current sub-frame or extended window;
   wherein selecting by the terminal the different carrying modes of the scheduling information to report the scheduling information, based on whether there is the grant for sending the new data within current sub-frame or extended window, comprises,
   when there is no available grant for sending the new data within current sub-frame or extended window, sending the scheduling information about grant request type via an Enhanced Random Uplink Control Channel (E-RUCCH), and
   when there is an available grant for sending the new data within current sub-frame or extended window, sending the scheduling information about scheduling request type with the grant, wherein the grant doesn't comprise grant allocated for an original E-RNTI by a Base Station (BS).

2. The method according to claim 1, wherein determining by the terminal whether the state transition occurs or the E-RNTI changes comprises:
   determining, by the terminal, whether the state transition occurs, according to a state indication carried in a dedicated signaling sent by a Radio Network Controller (RNC); or,
   determining, by the terminal, whether the E-RNTI changes, according to information stored in the terminal.

3. The method according to claim 1, wherein the state transition refers to that the terminal transits from cell dedicated channel (CELL-DCH) state to one of: cell forward access channel (CELL-FACH) state, cell paging channel (CELL-PCH) state, Universal Terrestrial Radio Access Network (UTRAN) Registration Area paging channel (URA-PCH) state.

4. The method according to claim 1, further comprising:
after determining the state transition occurs or the E-RNTI changes, and sending the scheduling information about the grant request type via the E-RUCCH, stopping an ongoing E-RUCCH process, that is, setting a sending counter and a timer of the E-RUCCH respectively as an original value.

5. A method for triggering scheduling information reporting, the method comprising:
receiving, by a Base Station (BS), scheduling information reporting triggered by a terminal, determining whether state transition occurs at the terminal or determining whether an Enhanced Dedicated Channel (E-DCH) Radio Network Temporary Identifier (E-RNTI) changes, according to the scheduling information reported;
when determining the state transition occurs at the terminal or the E-RNTI changes, determining, by the BS, a new data transmission format or a new E-RNTI for the terminal;
wherein determining by the BS the state transition occurs at the terminal or the E-RNTI changes, according to the scheduling information reported, comprises,
when the terminal reports the scheduling information via an Enhanced Random Uplink Control Channel (E-RUCCH), detecting, by the BS, the E-RNTI carried in the E-RUCCH; when detecting the E-RNTI is a new E-RNTI, determining the E-RNTI of the terminal changes, and
when the terminal reports the scheduling information with a new grant, determining, by the BS, whether there is an ongoing uplink data transmission of the terminal, by detecting new resources, and when determining there is an ongoing uplink data transmission of the terminal by detecting the new resources, determining the state transition occurs at the terminal, and determining the new data transmission format for the terminal.

6. The method according to claim 5, wherein the state transition refers to that the terminal transits from cell dedicated channel (CELL-DCH) state to one of: cell forward access channel (CELL-FACH) state, cell paging channel (CELL-PCH) state, Universal Terrestrial Radio Access Network (UTRAN) Registration Area paging channel (URA-PCH) state.

7. A terminal, comprising a determining module and a triggering module; wherein
the determining module is to determine whether state transition occurs at the terminal or whether an Enhanced Dedicated Channel (E-DCH) Radio Network Temporary Identifier (E-RNTI) changes; and the triggering module is to adopt reconfigured resources or a new E-RNTI to trigger scheduling information reporting, when the state transition occurs at the terminal or the E-RNTI changes;
wherein the triggering module is to select different carrying modes of the scheduling information to report the scheduling information, according to whether there is a grant for sending new data within current sub-frame or extended window;
wherein the triggering module is to send the scheduling information about grant request type via an Enhanced Random Uplink Control Channel (E-RUCCH), when there is no available grant for sending the new data within current sub-frame or extended window; and
the triggering module is to send the scheduling information about scheduling request type with the grant, when there is the available grant within current sub-frame or extended window.

8. The terminal according to claim 7, wherein
the determining module is to determine whether the state transition occurs, according to a state indication carried in a dedicated signaling sent by a Radio Network Controller (RNC); or
the determining module is to determine whether the E-RNTI changes, according to information stored in the terminal.

9. The terminal according to claim 7, further comprising a counter and timer controlling module, which is to set a sending counter and timer of the E-RUCCH respectively as an original value, after sending the scheduling information about the grant request type via the E-RUCCH.

10. A Base Station (BS), comprising a receiving module and a state determining module, wherein
the receiving module is to receive scheduling information reported by a terminal; and
the state determining module is to determine whether state transition occurs at the terminal or an Enhanced Dedicated Channel (E-DCH) Radio Network Temporary Identifier (E-RNTI) changes, according to the scheduling information reported;
when the terminal reports the scheduling information via an Enhanced Random Uplink Control Channel (E-RUCCH), the state determining module is to detect the E-RNTI carried by the E-RUCCH, when determining the E-RNTI is a new E-RNTI, the state determining module is to determine the E-RNTI of the terminal changes; and
when the terminal reports the scheduling information with a new grant, the state determining module is to detect whether there is an ongoing uplink data transmission of the terminal from new resources, when determining there is an ongoing uplink data transmission of the terminal from the new resources, the state determining module is to determine the state transition occurs at the terminal.

* * * * *